(12) United States Patent
Lee et al.

(10) Patent No.: US 12,524,930 B2
(45) Date of Patent: Jan. 13, 2026

(54) ELECTRONIC DEVICE FOR COLORIZING BLACK AND WHITE IMAGE USING GAN BASED MODEL COMPRISING TRANSFORMER BLOCK AND METHOD FOR OPERATION THEREOF

(71) Applicant: Industry-Academic Cooperation Foundation, Chosun University, Gwangju (KR)

(72) Inventors: Bum Shik Lee, Gwangju (KR); Muhammad Hamza Shafiq, Gwangju (KR)

(73) Assignee: Industry-Academic Cooperation Foundation, Chosun University, Gwangju (KR)

( * ) Notice: Subject to any disclaimer, the term of this patent is extended or adjusted under 35 U.S.C. 154(b) by 176 days.

(21) Appl. No.: 18/422,534

(22) Filed: Jan. 25, 2024

(65) Prior Publication Data

US 2024/0265587 A1  Aug. 8, 2024

(30) Foreign Application Priority Data

Feb. 3, 2023 (KR) ........................ 10-2023-0014792

(51) Int. Cl.
*G06T 11/00* (2006.01)
*G06N 3/08* (2023.01)
(Continued)

(52) U.S. Cl.
CPC .................................. *G06T 11/001* (2013.01)

(58) Field of Classification Search
CPC .................. G06T 11/001; G06T 3/4015; G06T 2207/20084; G06T 2207/20081;
(Continued)

(56) References Cited

U.S. PATENT DOCUMENTS 8,724,894 B1 * 5/2014 Jensen ................... H04N 1/646
358/529
2020/0167972 A1 * 5/2020 Birnhack ............... G06N 3/045
(Continued)

FOREIGN PATENT DOCUMENTS

KR  10-2020-0120970 A  10/2020

OTHER PUBLICATIONS

Shafiq et al.; "ColorFormer: A Novel Colorization Method Based on a Transformer"; pp. 1-12.

*Primary Examiner* — Wesner Sajous
(74) *Attorney, Agent, or Firm* — Studebaker Brackett PLLC (57) ABSTRACT

In accordance with various embodiments, an electronic device for colorizing a black and white image using a Generative Adversarial Network (GAN)-based model comprising a transformer block includes a processor, wherein the processor is set to: obtain a black and white image including only first information about a luminance channel; and generate a pseudo color image including only second information about a chrominance channel by applying the black and white image to the GAN-based model, the GAN-based model includes a generator network including a plurality of transformer blocks for color conversion, a plurality of convolution layers, and a plurality of transpose convolution layers, the plurality of transformer blocks each include a Depth Wise Convolution (DWC) layer, a first Layer Normalization (LN) layer, a Window-based Multi-head Self Attention (W-MSA) layer, a second LN layer, and a Colorization Feed Forward (CFF) block. Other various embodiments are possible.

6 Claims, 8 Drawing Sheets

(51) Int. Cl.
*G06T 5/60* (2024.01)
*G06T 7/13* (2017.01)

(58) Field of Classification Search
CPC . G06T 2207/10024; G06T 7/11; H04N 1/646; H04N 1/648; H04N 1/64; H04N 1/6058; H04N 1/6019; H04N 5/57–58; H04N 9/64–78; H04N 19/186; H04N 19/85; H04N 23/85; G09G 3/2803; G09G 3/3607; G09G 5/02; G09G 5/028; G09G 5/30; G09G 2320/02; G09G 2320/0233; G09G 2320/0238; G09G 2320/0271; G09G 2320/0276; G09G 2340/08; G09G 2340/06; G06N 3/08; G06N 3/045; G06N 5/02; G06N 20/00; G06V 10/141; G06V 10/143; G06V 10/40; G06V 10/60; G06V 10/70; G06V 10/75–80
See application file for complete search history.

(56) References Cited

U.S. PATENT DOCUMENTS

| | | | |
|---|---|---|---|
| 2021/0217212 A1* | 7/2021 | Birnhack | G06N 3/08 |
| 2022/0247889 A1* | 8/2022 | Babiloni | H04N 9/646 |
| 2024/0054615 A1* | 2/2024 | Young | G06T 3/18 |
| 2024/0193741 A1* | 6/2024 | Lee | G06T 7/13 |

\* cited by examiner

| Methods | PSNR [dB] | SSIM |
|---|---|---|
| Input | 27.8 | 0.06 |
| ChromaGAN [1] | 29.0 | 0.77 |
| Deoldify [2] | 29.2 | 0.75 |
| ColTran [3] | 29.2 | 0.810 |
| Proposed Network | 29.59 | 0.819 |

ELECTRONIC DEVICE FOR COLORIZING BLACK AND WHITE IMAGE USING GAN BASED MODEL COMPRISING TRANSFORMER BLOCK AND METHOD FOR OPERATION THEREOF

The work (result) is the result supported by Project for Supporting Excellent Scientists of Regional Universities through the National Research Foundation of Korea funded by the Ministry of Education in 2022(2022R1I1A3065473). This work was supported by the National Research Foundation of Korea (NRF) funded by the Korean Government under Grant. (2022R1I1A3065473).

CROSS-REFERENCE TO RELATED APPLICATIONS

This application claims the priority of Korean Patent Application No. 10-2023-0014792 filed on Feb. 3, 2023, in the Korean Intellectual Property Office, the disclosure of which is incorporated herein by reference.

BACKGROUND

Technical Field

Various embodiments of the present disclosure relates to an electronic device for colorizing a black and white image using a Generative Adversarial Network (GAN)-based model comprising a transformer block, and a method for operation thereof.

Description of the Related Art

A Generative Adversarial Network (GAN) is a machine learning model enabling a generator and a discriminator to automatically generate an image almost similar to a real image while competing with each other.

A GAN is composed of a generator trained to maximally deceive a discriminator by creating a fake image and a discriminator trained to maximally accurately discriminate a fake image and a real image. A GAN can generate a fake image very similar to a real image through a process of performing development through an adversarial process of repeatedly sequentially training a generator and a discriminator.

Further, a transformer has been actively studied in the field of Natural Language Processing (NLP), and currently, is applied and used for various problems even in the field of computer vision.

PRIOR ART DOCUMENT

Patent Document

Korean Patent Application Publication No. 10-2020-0120970 (published 2020 Oct. 23.) "A method and apparatus for generating image using a GAN based deep learning model"

SUMMARY

The present disclosure provides an electronic device that generates a color image composed of two chrominance channels from a black and white image composed of one luminance channel using a GAN-based model including a transformer block.

In accordance with various embodiments, an electronic device for colorizing a black and white image using a Generative Adversarial Network (GAN)-based model comprising a transformer block includes a processor, wherein the processor is set to: obtain a black and white image including only first information about a luminance channel; and generate a pseudo color image including only second information about a chrominance channel by applying the black and white image to the GAN-based model, the GAN-based model includes a generator network including a plurality of transformer blocks for color conversion, a plurality of convolution layers, and a plurality of transpose convolution layers, the plurality of transformer blocks each include a Depth Wise Convolution (DWC) layer, a first Layer Normalization (LN) layer, a Window-based Multi-head Self Attention (W-MSA) layer, a second LN layer, and a Colorization Feed Forward (CFF) block, the W-MSA layer includes a first-group MSA and a second-group MSA, and the first-group MSA may be provided with a feature map divided into first-type windows and the second-group MSA may be provided with a feature map divided into second-type windows obtained by shifting the first-type windows.

The present disclosure can provide an effect of generating a color image similar to the reality by colorizing a black and white image using a GAN-based model including a transformer block, and particularly, can provide a high-quality colorizing effect in comparison to other colorizing models by processing a feature map through a shifted window in a W-MSA layer in a transformer block.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

Hereafter, various embodiments of the present disclosure are described with reference to the accompanying drawings. Embodiments and terms used in the embodiments are not intended to limit the technical features described herein to specific embodiments and should be understood as including various changes, equivalents, and/or replacements of corresponding embodiments. In the description of drawings, similar components may be given similar reference numerals. Singular forms are intended to include plural forms unless the context clearly indicates otherwise. In the specification, the terms "A or B" or "at least one of A and/or B" may include all possible combinations of items to be enumerated together. The terms such as "first" and "second" used in various embodiments may modify corresponding components regardless of the order or priority and are used only to discriminate one component from another component without limiting the components. When a (e.g., first) component "is connected to (functionally or for communication)" or "accesses" another (e.g., second) component, the component may be connected to the another component directly or through another component (e.g., a third component).

In the specification, the term "configured (or set) to ~" may be interchangeably used with, for example, "suitable for ~", "having ability to ~", "~ changed to ~", "made to ~", "being capable of ~", or "designed to ~" in terms of hardware or software, depending situations. In some situations, the term "device configured to" may refer to that the device "is capable of doing" with other devices or parts. For example, a "processor configured to perform expressions A, B, and C" may refer to an exclusive processor (e.g., an embedded processor) for performing the corresponding operations or a generic-purpose processor (e.g., a CPU or an application processor) being capable of performing the corresponding operations by executing one or more software programs stored in a memory device.

Electronic devices according to various embodiments of the present disclosure may include, for example, at least one of a smartphone, a tablet PC, a desktop, a laptop, a netbook, a workstation, and a server.

An electronic device 101 in a network environment 100 according to various embodiments is described with reference to FIG. 1. The electronic device 101 may include a bus 110, a processor 120, a memory 130, an I/O interface 150, a display 160, and a communication interface 170. In another embodiment, the electronic device 101 may not include at least one of the components or may additionally include other components. The bus 110 may include a circuit that connects the components 110~170 and transmits communication (e.g., control messages or data) between the components. The processor 120 may include one or more of a central processing unit, an application processor, of a communication processor (CP). The processor 120, for example, can perform operations or data processing about control and/or communication of at least one other component of the electronic device 101.

The memory 130 may include a volatile and/or nonvolatile memory. The memory 130 can store, for example, instructions or data related to at least one other component of the electronic device 101. According to an embodiment, the memory 130 can store software and/or a program 140. The program 140 may include, for example, a kernel 141, a middleware 143, an application programming interface (API) 145, and/or an application program (or an "application") 147, etc. At least some of the kernel 141, the middleware 143, or the API 145 may be referred to as an operating system. The kernel 141, for example, can control or manage system resources (e.g., the bus 110, processor 120, or memory 130) that are used to perform operations or functions implemented by other programs (e.g., the middleware 143, the API 145, or the application program 147). Further, the kernel 141 can provide an interface that can control or manage system resources by accessing individual components of the electronic device 101 through the middleware 143, the API 145, or the application program 147.

The middleware 143, for example, can function as a relay so that the API 145 or the application program 147 can transmit and receive data by communicating with the kernel 141. Further, the middleware 143 can process one or more work requests received from the application program 147 in order of priority. For example, the middleware 143 can give a priority to be able to use system resources (e.g., the bus 110, the processor 120, or the memory 130) of the electronic device 101 to at least one of the application programs 147 and can process the one or more work requests. The API 145, which is an interface for the application 147 to control a functions provided from the kernel 141 or the middleware 143, for example, may include at least one interface or function (e.g., command) for file control, window control, image processing, or text control. The I/O interface 150, for example, can transmit instructions or data input from a user or another external device to other component(s) of the electronic device 101 or can output instructions or data received from other component(s) of the electronic device 101 to a user or another external device.

The display 160, for example, may include a Liquid Crystal Display (LCD), a Light Emitting Diode (LED) display, an Organic Light Emitting Diode (OLED) display, or a Micro Electronic Mechanical System (MEMS) display, or an electronic paper display. The display 160, for example, can display various contents (e.g., a text, an image, a video, an icon, and/or a symbol) to a user. The display 160 may include a touch screen and, for example, can receive touching, gesturing, approaching, or hovering input by an electronic pen or a part of the body of a user. The communication interface 170, for example, can set communication between the electronic device 101 and an external device (e.g., a first external electronic device 102, a second external electronic device 104, or a server 106). For example, the communication interface 170 can be connected to the network 162 and can communicate with an external device (e.g., the second external electronic device 104 or the server 106) through wireless communication or wired communication.

The wireless communication, for example, may include cellular communication using at least one of LTE, LTE-A (LTE Advance), Code Division Multiple Access (CDMA), Wideband CDMA (WCDMA), Universal Mobile Telecommunications System (UMTS), Wireless Broadband (WiBro), and Global System for Mobile Communications (GSM). According to an embodiment, the wireless communication may include at least one of Wireless Fidelity (WiFi), Bluetooth, Bluetooth Low Energy (BLE), Zigbee, Near Field Communication (NFC), magnetic secure transmission, Radio Frequency (RF), or Body Area Network (BAN). According to an embodiment, the wireless communication may include GNSS. GNSS, for example, may be a Global Positioning System (GPS), a Global Navigation Satellite System (Glonass), a Beidou Navigation Satellite System (hereafter, "Beidou"), or a Galileo, the European global satellite-based navigation system. In the following description, "GPS" may be used interchangeably with "GNSS". The wired communication, for example, may include at least one of a Universal Serial Bus (USB), a High Definition Multimedia Interface (HDMI), an RS-232 (Recommended Standard 232), power line communication, or a Plain Old Telephone Service (POTS). The network 162 may include at least one of telecommunication networks, for example, a computer network (e.g., LAN or WAN), the internet, and a telephone network.

The first and second external electronic devices 102 and 104 may be devices that are the same kind as or different kinds from the electronic device 101. According to various embodiments, all or some of operations that are performed by the electronic device 101 may be performed by another electronic device or a plurality of other electronic devices (e.g., the electronic devices 102 and 104 or the server 106). According to an embodiment, when the electronic device 101 has to perform a function or a service automatically or due to a request, the electronic device 101 may request at least partial function related to the function or the service to another device (e.g., the electronic devices 102 and 104 or the server 106) additionally or instead of performing the function or the service by itself. Another electronic device (e.g., the electronic devices 102 and 104 or the server 106) can perform the requested function or the additional function and transmit the result to the electronic device 101. The electronic device 101 can provide the requested function or service on the basis of the received result or by additionally processing the received result. To this end, for example, cloud computing, distributed computing, or client-server computing may be used.

Figure 2:
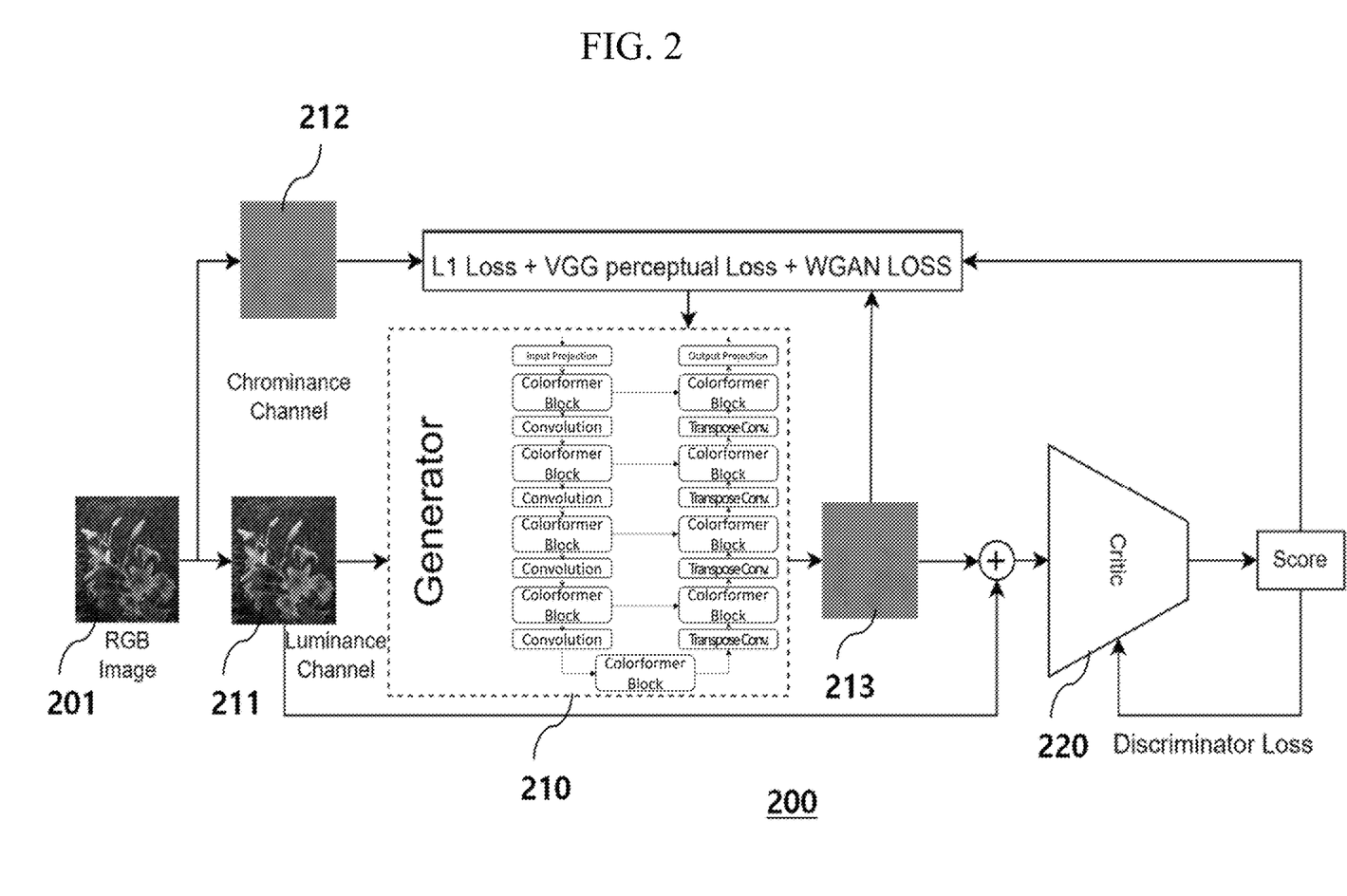
FIG. 2 is a diagram for describing an operation of colorizing a black and white image using a GAN-based model including a transformer by means of an electronic device according to various embodiments.

FIG. 2 is a diagram for describing an operation of colorizing a black and white image using a GAN-based model including a transformer by means of an electronic device (e.g., the electronic device 101 of FIG. 1) according to various embodiments.

Figure 3:
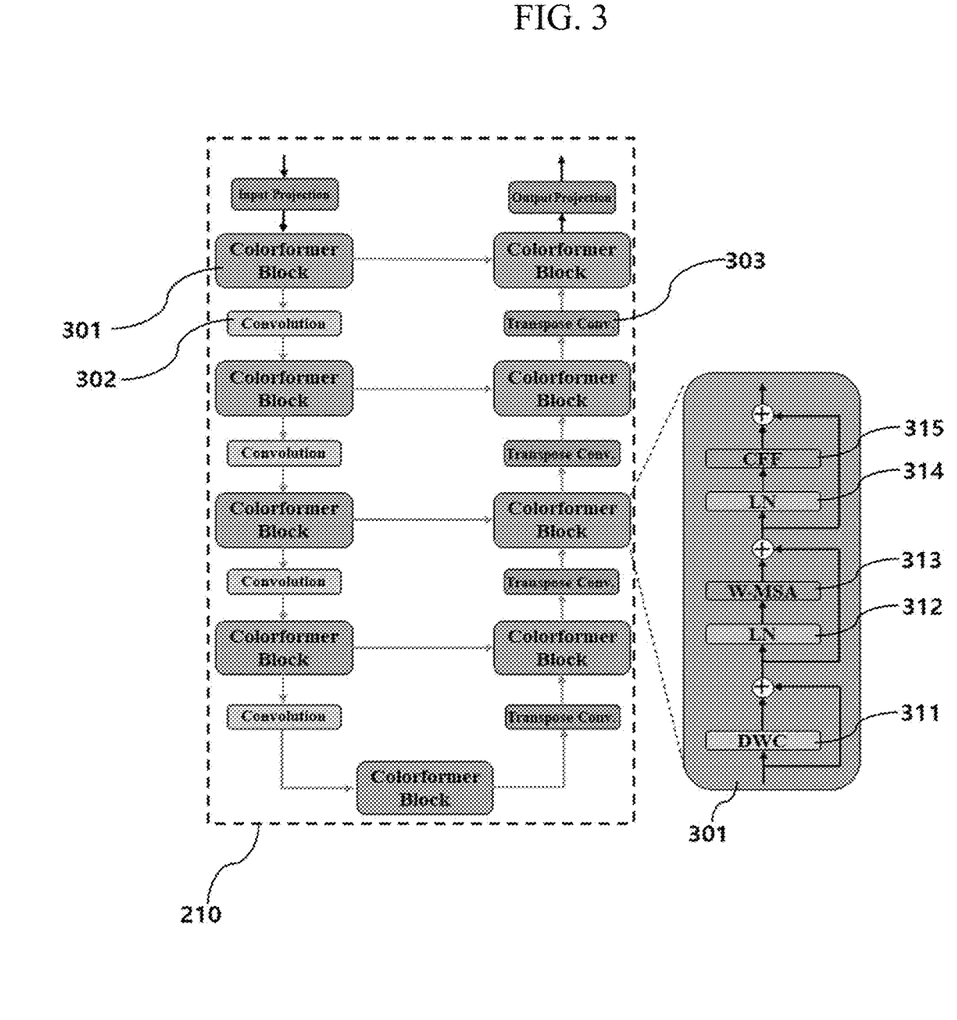
FIG. 3 is a diagram for describing the structure of the transformer block included in the GAN-based model according to various embodiments.
Figure 4:
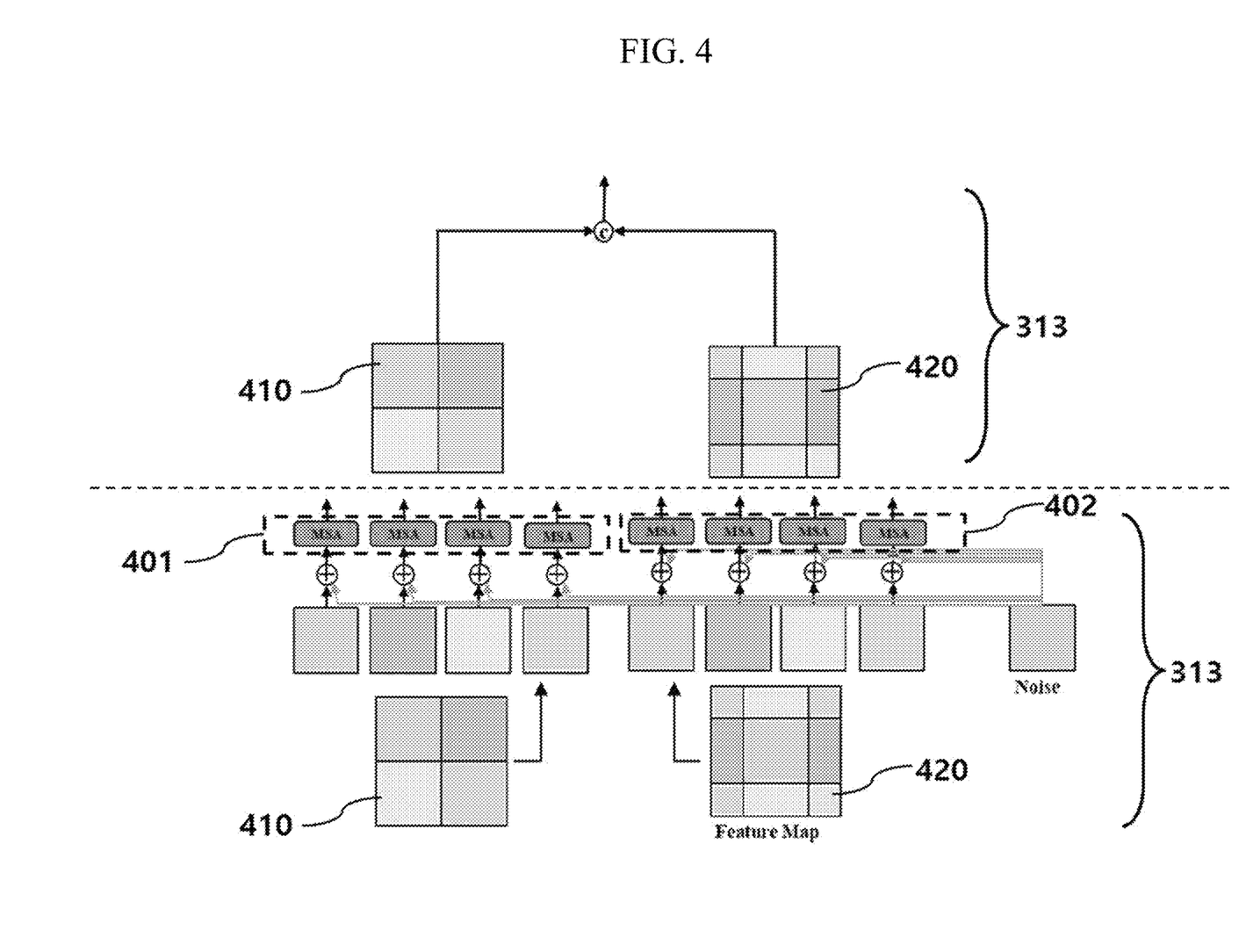
FIG. 4 is a diagram for describing the structure of a W-MSA layer in the transformer block according to various embodiments.

FIG. 3 is a diagram for describing the structure of the transformer block included in the GAN-based model according to various embodiments;

FIG. 4 is a diagram for describing the structure of a W-MSA layer in the transformer block according to various embodiments.

Figure 5:
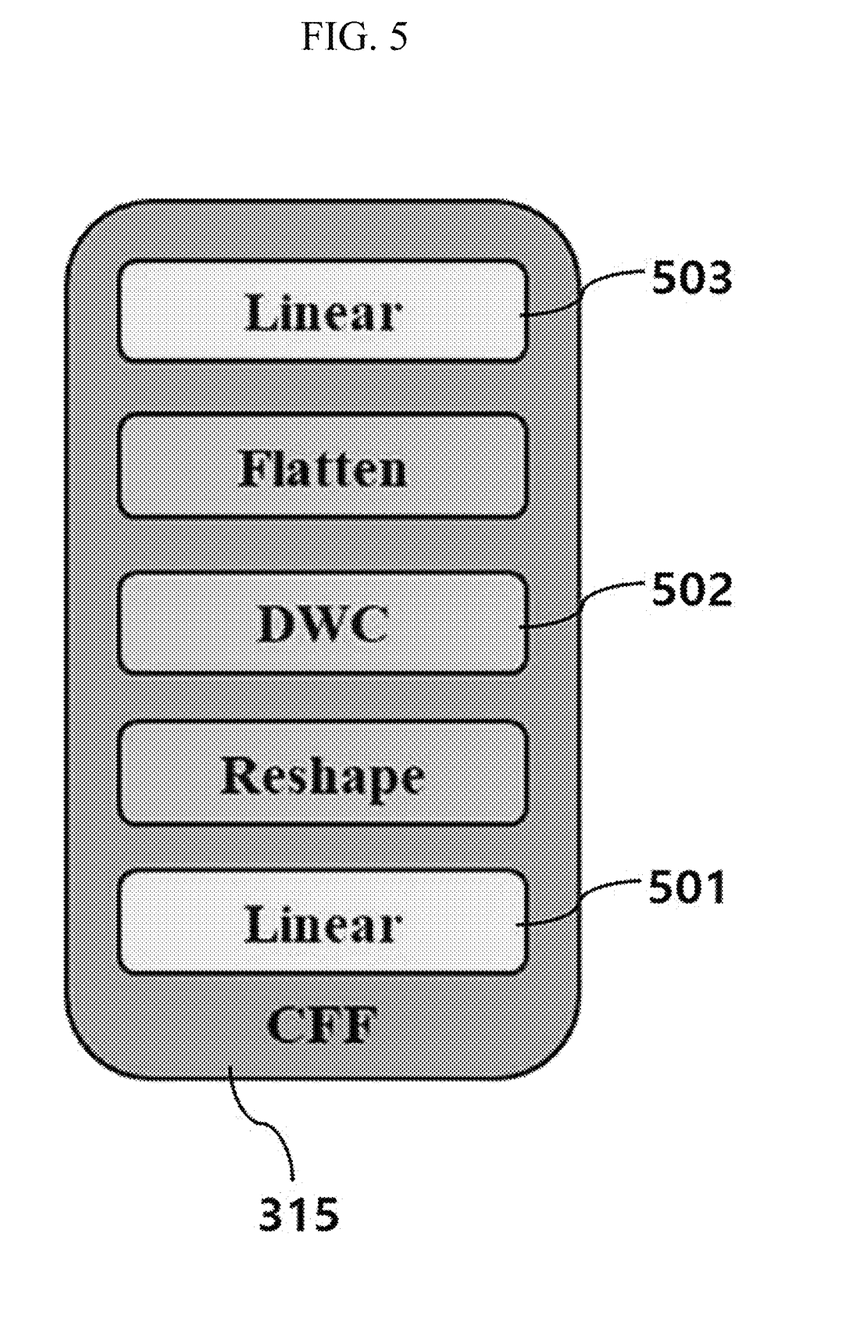
FIG. 5 is a diagram for describing the structure of a CFF layer according to various embodiments.

FIG. 5 is a diagram for describing the structure of a CFF layer according to various embodiments.

According to various embodiments, an electronic device (e.g., the processor 120 of FIG. 1) can obtain a black and white image including only first information about a luminance channel. According to an embodiment, referring to FIG. 2, the electronic device 101 can generate a black and white image 211 including only first information about a luminance channel and a correct answer color image 212 including only second information about a chrominance channel using an RGB image 201 in order to train a GAN-based model 200 including a transformer block. For example, the electronic device 101 can convert the RGB image 201 into an image of a CIELAB color space, generate a black and white image 211 including information about a luminance channel by extracting an L value from the L value, an A value, and a B value of the CIELAB color space, and generate a correct answer color image 212 including information about a chrominance channel by extracting the L value and the A value. The luminance channel may be composed of one channel and the chrominance channel may be composed of two channels. According to an embodiment, the electronic device 101 can obtain a black and white image 211 to be colorized from an external device (e.g., the electronic device 102 or the server 106 of FIG. 1) to perform image colorizing using the trained GAN-based model 200.

According to various embodiments, the electronic device (e.g., the processor 120 of FIG. 1) can generate a pseudo color image 213 including only the second information about the chrominance channel by applying the black and white image 211 to the GAN-based model 200. In accordance with an embodiment, referring to FIG. 2, the electronic device 101 can generate a pseudo color image 213 including only the second information about the chromi- nance channel by applying the black and white image 211 to a generator network 210 included in the GAN-based model 200. The pseudo color image 213 may means an image obtained by colorizing the black and white image 211.

In accordance with various embodiments, referring to FIG. 3, the GAN-based model 200 may include a generator network 210 including a plurality of transformer blocks 301 for color conversion, a plurality of convolution layers 302, and a plurality of transpose convolution layers 303 According to an embodiment, the generator network 201 may have an encoder-decoder-based architecture that uses a plurality of transformer blocks.

In accordance with an embodiment, referring to FIG. 3, the transformer blocks 301 may include a Depth Wise Convolution (DWC) layer 311, a first Layer Normalization (LN) layer 312, a Window-based Multi-head Self Attention (W-MSA) layer 313, a second LN layer 314, and a Colorization Feed Forward (CFF) block 315.

According to an embodiment, the DWC layer 311 may be implemented in the transformer blocks 311 to obtain local information. Since a pixel color may change in correspondence to surrounding pixel colors, local information is important in colorization. Although will be described below, the CFF block 315 also may include a DWC layer to obtain local information.

According to an embodiment, the first LN layer 312 and the second LN layer 314 may include an LN layer that is used in existing transformer blocks and this is a configuration that can be easily achieved by those skilled in the art, so it is not described.

In accordance with an embodiment, referring to FIG. 4, the W-MSA layer 313 may include a first-group MSA 401 and a second-group MSA 402, the first-group MSA 401 may be provided with a feature map 410 divided into first-type windows, and the second-group MSA 402 may be provided with a feature map 420 divided into second-type windows obtained by shifting the first-type windows. According to an embodiment, the first-group MSA 401 and the second-group MSA 402 each may be composed of four heads, so the W-MSA layer 313 may include a total of eight heads. In detail, the each window of the feature map 410 divided into the first-type windows can be provided to the first-group MSA 401 and each window of the feature map 420 divided into the second-type windows can be provided to the second-group MSA 402. In this case, the W-MSA layer 313 can transmit a value concatenating result values of the first-group MSA 401 and the second-group MSA 402 to a next layer (e.g., the second LN layer 314).

In accordance with an embodiment, referring to FIG. 5, the CFF block 315 may be implemented to obtain local information and may include a first linear layer 501, a DWC layer 502, and a second linear layer 503. The local information may be as important as a process of obtaining global information using Multi-Layer Perceptron (MLP) in most transformer blocks. According to the CFF block 315, features are reshaped into a structure suitable for input to the DWC layer 502 after passing through the first linear layer 501 and the DWC layer 502 may be applied to reduce complexity. The CFF block 315 can pass features through the second linear layer 503 by performing flattening on the features after the features are convoluted through the DW C layer 502.

In accordance with an embodiment, referring to FIG. 2, the electronic device 101 can generate a final color image by combining the pseudo color image 213 generated by the generator network 210 with the black and white image 211 that is an input image through the GAN-based model 200.

In accordance with an embodiment, referring to FIG. 2, a discriminator network 220 (e.g., a critic) may include a discriminator network that is used in an existing GAN-based model and this is a configuration that can be easily achieved by those skilled in the art, so it is not described.

In accordance with an embodiment, referring to FIG. 2, the GAN-based model 200 can be trained using a total loss $L_{total}$ considering all of a pixel wise (L1) loss function $L_{L1}$, a VGG loss function $L_{VGG}$, and a WGAN loss function $L_{wgan}$. In this case, the pixel wise (L1) loss function $L_{L1}$, the VGG loss function $L_{VGG}$, the WGAN loss function $L_{wgan}$, and the total loss $L_{total}$ can be calculated from the following [Equation 1].

[Equation 1]

$$L_{wgan} \begin{cases} L_G = -E_{\tilde{y}}[D(\tilde{y}, x)] \\ L_D = E_y[D(y, x)] - E_{\tilde{y}}[D(\tilde{y}, x)] + \lambda \times GP \end{cases} \quad 1$$

$$L_{L1} = \|J - G(I)\|_1 \quad 2$$

$$L_{VGG} = \|\varphi(J) - \varphi(G(I))\|_2^2 \quad 3$$

$$L_{total} = L_{wgan} + \lambda_1 L_{L1} + \lambda_2 L_{VGG} \quad 4$$

where J may be a color image corresponding to a ground truth, G(I) may be a pseudo color image, and $\lambda$, $\lambda_1$, an $d\lambda_2$ may be weights.

According to an embodiment, the generator network 210 may be trained on the basis of a total loss of the pixel wise (L1) loss function $L_{L1}$, the VGG loss function $L_{VGG}$, the WGAN loss function $L_{wgan}$.

Figure 1:
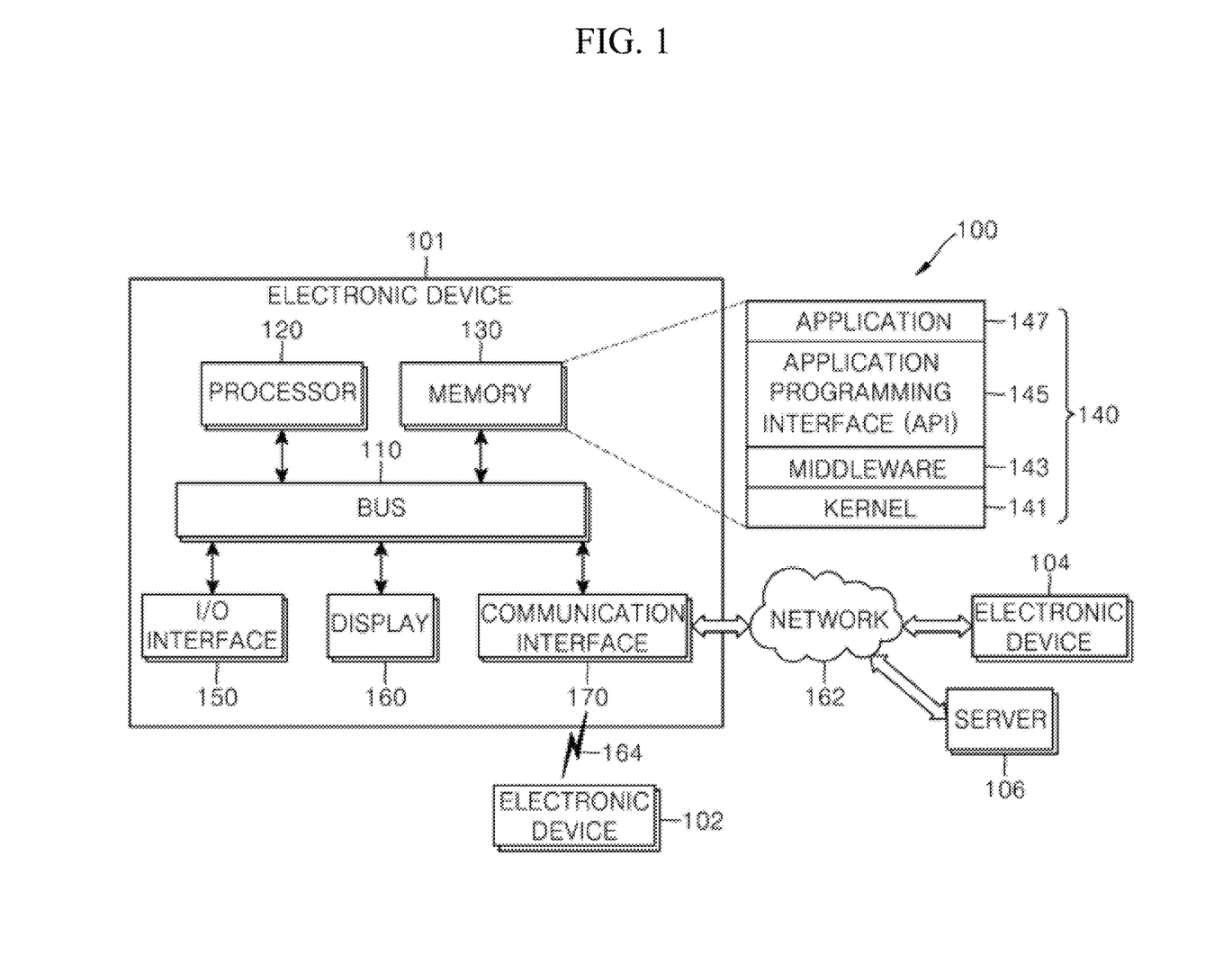
FIG. 1 is a block diagram of an electronic device and a network according to various embodiments of the present disclosure.
Figure 6:
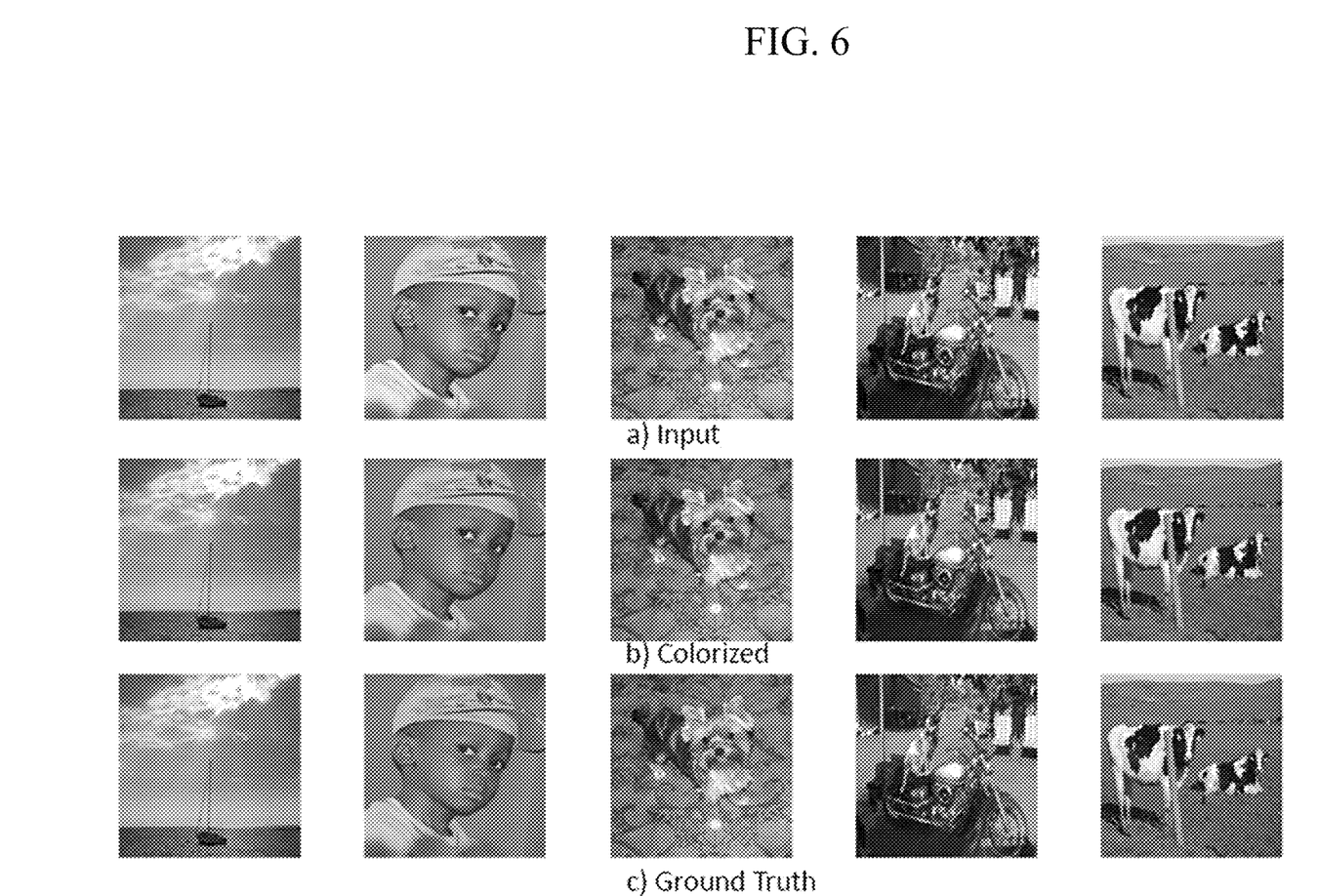
FIG. 6 shows an embodiment of generating a final color image from a black and white image using a GAN-based model by means of the electronic device according to various embodiments.

FIG. 6 shows an embodiment of generating a final color image from a black and white image using a GAN-based model (e.g., the model 200 of FIG. 2) by means of an electronic device (e.g., the electronic device 101 of FIG. 1).

The electronic device 101 according to the present disclosure can generate a final color image, for example, a "b) colorized" using the GAN-based model 200 by obtaining a black and white image, for example, a "a) input" including only information about a luminance channel. In this case, the electronic device 101 can train the GAN-based model 200 using a learning image, for example, a "c) ground truth".

Figure 7A:
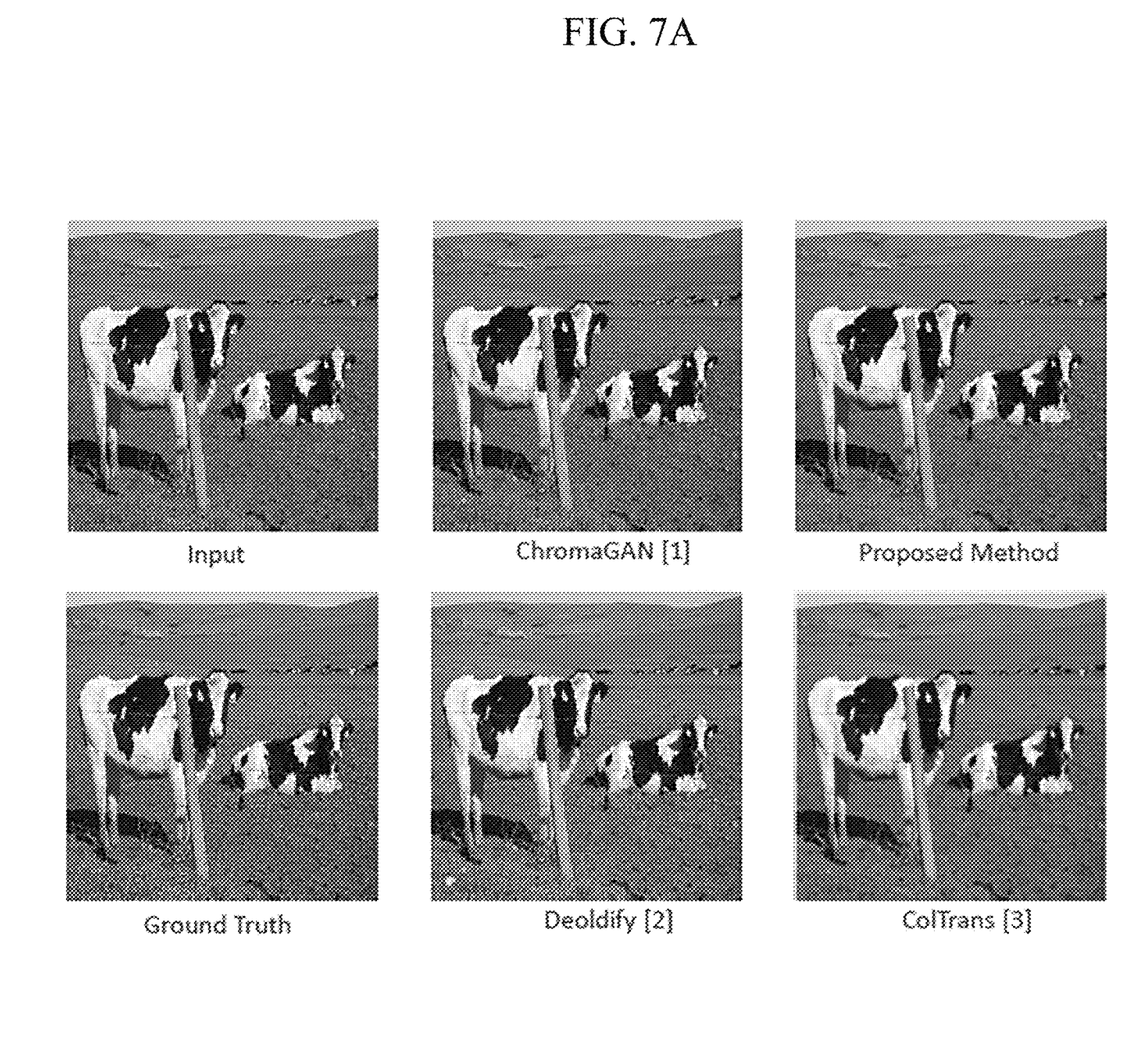
FIGS. 7A and 7B are diagrams showing the difference between a GAN-based model to which the present disclosure has been applied and another colorizing model in accordance with various embodiments.
Figure 7B:
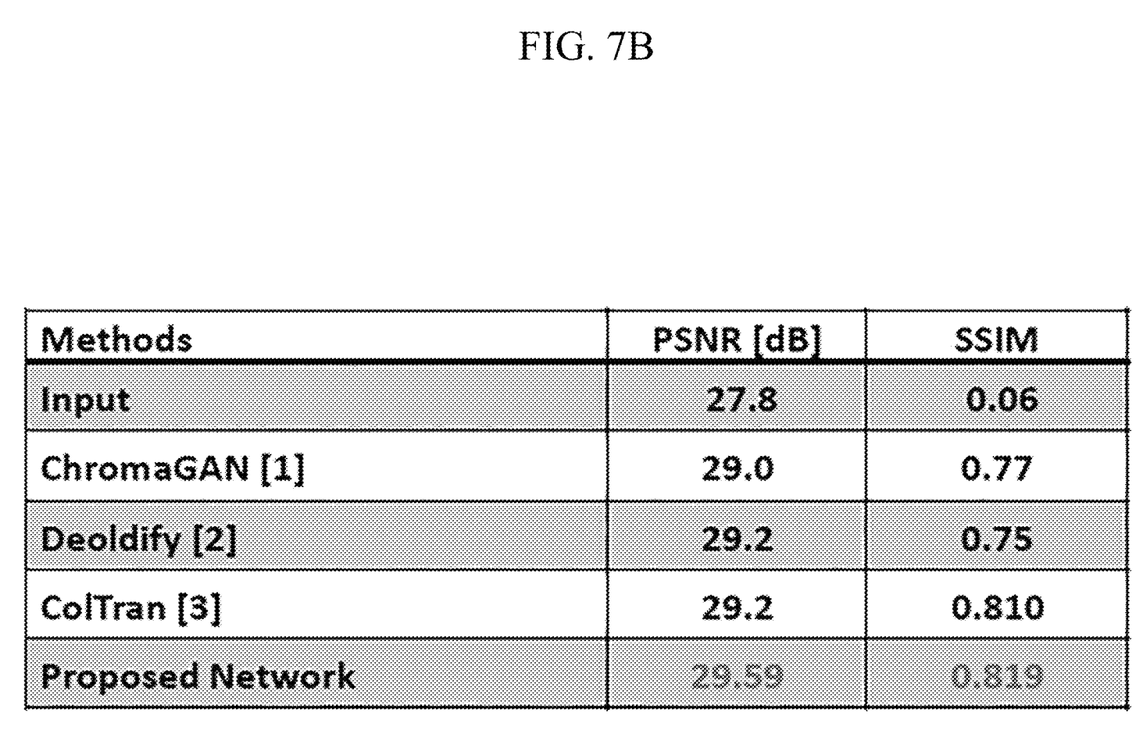

FIGS. 7A and 7B are diagrams showing the difference between a GAN-based model (e.g., the model 200 of FIG. 2) to which the present disclosure has been applied and another colorizing model in accordance with various embodiments.

Referring to FIG. 7A, it can be seen that a final color image (e.g., a proposed method) generated from an input black and white image using the GAN-based model 200 to which the present disclosure has been applied is close to an original image (e.g., a Ground Truth) in comparison to color images (e.g., ChromaGAN, Deoldify, and ColTrans) generated using other colorizing models.

Further, referring to FIG. 7B, it can be seen that when the GAN-based model 200 to which the present disclosure has been applied is used, the quality is highest in comparison to when other colorizing models are used, or a color image that is the most similar to the original image is generated.

In accordance with various embodiments, an electronic device for colorizing a black and white image using a Generative Adversarial Network (GAN)-based model including a transformer block includes a process, in which the processor may be set to obtain a black and white image including only first information about a luminance channel and generate a pseudo color image including only second information about a chrominance channel by applying the black and white image to the GAN-based model, the GAN-based model may include a generator network including a plurality of transformer blocks for color conversion, a plurality of convolution layers, and a plurality of transpose convolution layers, the plurality of transformer blocks each may include a Depth Wise Convolution (DWC) layer, a first Layer Normalization (LN) layer, a Window-based Multi-head Self Attention (W-MSA) layer, a second LN layer, and a Colorization Feed Forward (CFF) block, the W-MSA layer may include a first-group MSA and a second-group MSA, the first-group MSA may be provided with a feature map divided into first-type windows, and the second-group MSA may be provided with a feature map divided into second-type windows obtained by shifting the first-type windows.

In accordance with various embodiment, the first-group MSA and the second-group MSA each may be composed of four heads.

In accordance with various embodiments, the W-MSA layer can transmit a value concatenating a result value of the first-group MSA and a result value of the second-group MSA to a next layer.

In accordance with various embodiments, the generator network may have an encoder-decoder-based architecture that uses the plurality of transformer blocks.

According to various embodiments, the GAN-based model is trained using a total loss $L_{total}$ considering all of a pixel wise (L1) loss function $L_{L1}$, a VGG loss function $L_{VGG}$, and a WGAN loss function $L_{wgan}$, and the pixel wise (L1) loss function $L_{L1}$, the VGG loss function $L_{VGG}$, the WGAN loss function $L_{wgan}$, and the total loss $L_{total}$ can be calculated from the following [Equation 1]

[Equation 1]

$$L_{wgan} \begin{cases} L_G = -E_{\tilde{y}}[D(\tilde{y}, x)] \\ L_D = E_y[D(y, x)] - E_{\tilde{y}}[D(\tilde{y}, x)] + \lambda \times GP \end{cases} \quad 1$$

$$L_{L1} = \|J - G(I)\|_1 \quad 2$$

$$L_{VGG} = \|\varphi(J) - \varphi(G(I))\|_2^2 \quad 3$$

$$L_{total} = L_{wgan} + \lambda_1 L_{L1} + \lambda_2 L_{VGG} \quad 4$$

where J is a color image corresponding to a ground truth, G(I) is a pseudo color image, and $\lambda$, $\lambda_1$, an $d\lambda_2$ are weights.

In accordance with various embodiments, the processor may be set to generate a final color image by combining the black and white image and the pseudo color image through the GAN-based model.

The term "module" or "unit" used herein may include a unit implemented as hardware, software, or firmware, and for example, may be mutually used with terms such as a logic, a logical block, a part, or a circuit. The "module" or "~ unit" may be an integrated part, or the minimum unit or a portion that performs one or more functions. The "module" or "~ unit" may be mechanically or electronically implemented, and for example, may include an application-specific integrated circuit (ASIC) chip, field-programmable gate arrays (FPGAs), or a programmable logic device that has been known or will be developed and performs some operations, and may be executed by the processor 120. At least some of devices (e.g., modules or the functions thereof) or methods (e.g., operations) according to various embodiments may be implemented into a program module type by instructions stored in a computer-readable recording medium (e.g., the memory 130). When the instructions are executed by a processor (e.g., the processor 120), the processor can perform functions corresponding to the instructions. The computer-readable recording medium may include a hard disk, floppy disk, a magnetic medium (e.g., a magnetic tape), an optical recording medium (e.g., a CD-ROM and a DVD), a magnet-optical medium (e.g., a floptical disk), a built-in memory, etc. Commands may include codes constructed by a compiler or codes that can be executed by an interpreter. Modules or program modules according to various embodiments may include at least one or more of the components described above, may be partially omitted, or may further include other components. Operations that are performed by modules, program modules, or other components according to various embodiments may be performed sequentially, in parallel, repeatedly, or heuristically, or at least some operations may be performed in another order or omitted, or other operations may be added.

Further, embodiments described herein are proposed to explain and help understand the disclosure and do not limit the scope of the disclosure. Accordingly, the scope of the present disclosure should be construed as including all changes based on the spirit of the disclosure or other various embodiments.

What is claimed is:

1. An electronic device for colorizing a black and white image using a Generative Adversarial Network (GAN)-based model comprising a transformer block, the electronic device comprising a processor,
    wherein the processor is set to:
    obtain a black and white image including only first information about a luminance channel; and
    generate a pseudo color image including only second information about a chrominance channel by applying the black and white image to the GAN-based model,
    the GAN-based model includes a generator network including a plurality of transformer blocks for color conversion, a plurality of convolution layers, and a plurality of transpose convolution layers,
    the plurality of transformer blocks each include a Depth Wise Convolution (DWC) layer, a first Layer Normalization (LN) layer, a Window-based Multi-head Self Attention (W-MSA) layer, a second LN layer, and a Colorization Feed Forward (CFF) block,
    the W-MSA layer includes a first-group MSA and a second-group MSA, and
    the first-group MSA is provided with a feature map divided into first-type windows and the second-group MSA is provided with a feature map divided into second-type windows obtained by shifting the first-type windows.

2. The electronic device of claim 1, wherein the first-group MSA and the second-group MSA are each composed of four heads.

3. The electronic device of claim 2, wherein the W-MSA layer transmits a value concatenating a result value of the first-group MSA and a result value of the second-group MSA to a next layer.

4. The electronic device of claim 3, wherein the generator network has an encoder-decoder-based architecture that uses the plurality of transformer blocks.

5. The electronic device of claim 4, wherein the GAN-based model is trained using a total loss $L_{total}$ considering all of a pixel wise (L1) loss function $L_{L1}$, a VGG loss function $L_{VGG}$, and a WGAN loss function $L_{wgan}$, and
    the pixel wise (L1) loss function $L_{L1}$, the VGG loss function $L_{VGG}$, the WGAN loss function $L_{wgan}$, and the total loss $L_{total}$ are calculated from the following [Equation 1],

[Equation 1]

$$L_{wgan} \begin{cases} L_G = -E_{\hat{y}}[D(\hat{y}, x)] & 1 \\ L_D = E_y[D(y, x)] - E_{\hat{y}}[D(\hat{y}, x)] + \lambda \times GP \end{cases}$$

$$L_{L1} = \|J - G(I)\|_1 \qquad 2$$

$$L_{VGG} = \|\varphi(J) - \varphi(G(I))\|_2^2 \qquad 3$$

$$L_{total} = L_{wgan} + \lambda_1 L_{L1} + \lambda_2 L_{VGG} \qquad 4$$

where J is a color image corresponding to a ground truth, G(I) is a pseudo color image, and $\lambda$, $\lambda_1$, an d$\lambda_2$ are weights.

6. The electronic device of claim 5, wherein the processor is set to generate a final color image by combining the black and white image and the pseudo color image through the GAN-based model.

* * * * *